United States Patent [19]
Phipps et al.

[11] Patent Number: 4,589,525
[45] Date of Patent: May 20, 1986

[54] BRAKING APPARATUS

[76] Inventors: Warren W. Phipps, 467 College Street; Richard C. E. Kee, 16 Clarke Avenue; T. Paul Mather, 27 Shamrock Street, all of Palmerston North, New Zealand

[21] Appl. No.: 610,600

[22] Filed: May 15, 1984

[30] Foreign Application Priority Data

May 16, 1983 [NZ] New Zealand .................. 204245

[51] Int. Cl.⁴ .................................. B60T 1/00
[52] U.S. Cl. ........................... 188/2 F; 188/74
[58] Field of Search ............... 188/2 F, 19, 20, 30, 188/31, 69, 24.14, 24.15, 24.16, 24.17, 1.12, 74, 82.2; 16/35 D, 35 R; 74/527, 96

[56] References Cited

U.S. PATENT DOCUMENTS 4,101,143 7/1978 Sieber ........................ 188/2 F

FOREIGN PATENT DOCUMENTS 2532485 2/1977 Fed. Rep. of Germany ...... 188/2 F
1243032 8/1971 United Kingdom .
2110780 6/1983 United Kingdom .............. 188/82.2

Primary Examiner—Bruce H. Stoner, Jr.
Assistant Examiner—Alvin Oberley
Attorney, Agent, or Firm—Holman & Stern

[57] ABSTRACT

A braking apparatus particularly useful on wheelchair tires, baby carriages, handcarts or the like comprises a main body member mounted on or integral with a frame of an associated vehicle, a lever arm pivoted on the main body, a cam having two operative lobes pivotally mounted on the lever arm, the cam being pivotal over an arc of predetermined length relative to the lever arm and an operating member for pivoting the lever arm. In use, when the lever arm is inoperative the cam is out of contact with its associated tire and when the lever arm is in its operative position a cam lobe surface contacts the tire and is pivoted to apply a braking force, the particular lobe producing the braking when the tire is rotated depending upon the direction of rotation of the tire.

10 Claims, 5 Drawing Figures

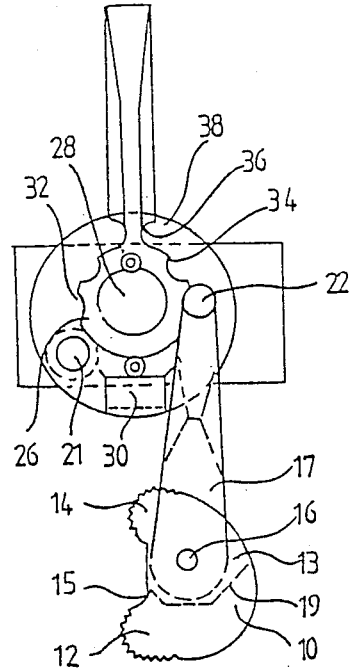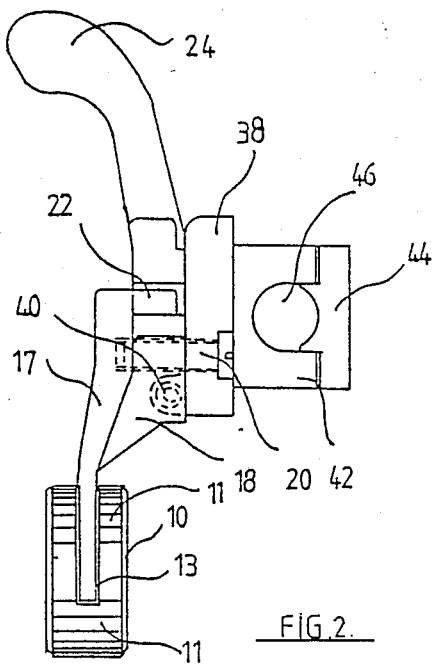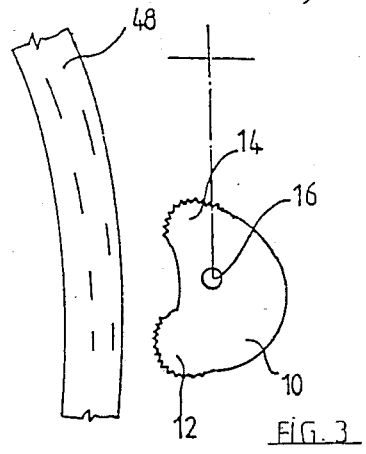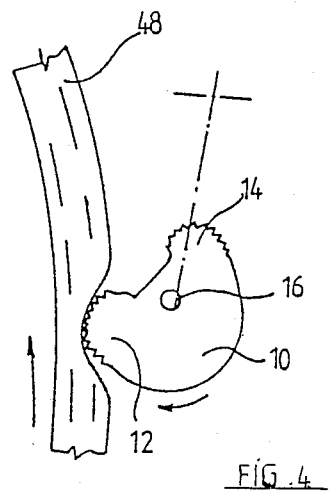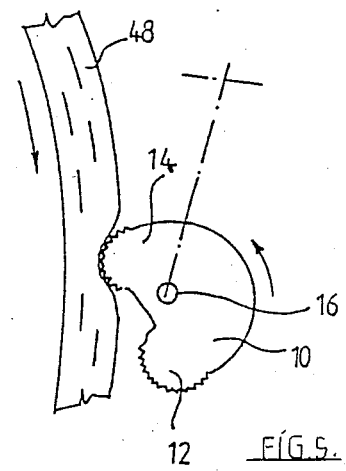

BRAKING APPARATUS

BACKGROUND OF THE INVENTION

1. Field of Invention

This invention relates to a braking apparatus for use with a tire having a resilient rolling surface. More particularly the invention relates to a braking apparatus for use with wheelchairs, baby carriages, handcarts of similar vehicles but is not limited thereto.

2. Description of the Prior Art

It is known to use a substantially circular pivotal cam mounted on a lever arm as a brake when applied against the rolling surfce of a tire on a wheelchair, pram, pushcart of similar vehicle. While such a cam brake will be effective when the tire is rotating in one direction it is less effective when the tire is rotating in the opposite direction. If the brake is being applied by a disabled person in a wheelchair and it is ineffective, the consequences could be serious.

It is an object of this invention to alleviate this disadvantage.

SUMMARY OF THE INVENTION

Accordingly the invention may be said broadly to consist in a braking apparatus suitable for use with a tire having a resilient rolling surface comprising:

a main body member mountable upon or integral with a frame associated with a tire, a first lever arm pivotal on the main body member, a cam having two oprative lobes mounted on the first lever arm and being pivotal over an arc of a predetermined length relative to the first lever arm, means for pivoting the first lever arm, the arrangement being such that in use when the main body member is mounted on a frame associated with a tire and the first lever arm is in its inoperative position the tire is out of contact with the cam and may rotate freely relative thereto and when the first lever arm is in its operative position one cam lobe comes into contact with and is pivoted to apply a braking pressure to the tire when the tire is rotating in one direction and the second cam lobe comes into contact with and is pivoted to apply a braking pressure to the tire when said tire is rotating in the opposite direction.

Preferably the means for pivoting the first lever arm comprises a curved pivotal cam mounted on the main body member, the curved surface thereof having two indents to receive a pin member on the first lever arm, the indents being of different depths, biasing means for biasing the first lever arm so that a pin member on the first lever arm rests in one or the other of the indents, the arrangement being such that in use when the pin member is in the deepest indent said first lever arm is in its inoperative position and when the pin member is in the less deep indent the first lever arm is in its operative position.

Preferably the cuved cam surface has an additional pin member receiving area on its curved surface corresponding to a maximum degree of pivoting of the first lever arm whereby the lobes are pivoted to provide an even greater braking action than when the pin member is in the less deep indent.

Preferably there is a second lever arm projecting radially outward from the curved cam surface to pivot the curved pivotal cam.

Preferably there are provided teeth on the cam lobes.

Preferably the main body member is mountable on an arm frame member of a wheelchair in association with the tire of a the wheelchair.

BRIEF DESCRIPTION OF THE DRAWINGS

The invention may be more fully understood by the following detailed description with reference to the accompanying drawings wherein:

FIG. 1 is a side elevational view of a preferred embodiment of the invention;

FIG. 2 is an end elevational view of a preferred embodiment of the invention; and FIGS. 3, 4 and 5 are schematic partial side elevation views of the cam showing three different modes of operation of the braking apparatus according to the invention.

DETAILED DESCRIPTION OF THE DRAWINGS

Referring to FIGS. 1 and 2 the braking apparatus comprises a cam 10 having operative lobes 12 and 14. Lobes 12 and 14 are preferably provided with serrated edges or teeth 11. Cam 10 is pivotal about pin 16 which passes through first lever arm 17 near the end thereof. Cam 10 is split leaving the slot 13 shown in FIG. 2. It will be seen in FIG. 1 that the bottom portions 15 and 19 of slot 13 limit the degree of pivoting of cam 10 about pin 16.

Lever arm 17 is mounted on and pivotal about a first pin 20. In a preferred embodiment pin 20 is threaded through main body member 38 and the end of pin 20 is threaded into first lever arm 17. At the end of lever arm 17 closest to pin 20 there is provided a second pin 22, the function of which will become apparent from the description below. Gusset 18 reinforces lever arm 17 as shown in FIG. 2. A second lever arm 24 extends radially outwardly from a pivotal curved cam 26. Cam 26 is pivotal about stub axle 28 which extends upwardly from body member 38. Cam 26 is circular but in its peripheral surface there are provided two pairs of indents 32 and 34. The indents 34 are twice the depth of the indents 32. The right hand indent 32 is not visible in FIG. 1 as it is hidden by the second pin 22 on lever arm 17. There is an additional pair of indents 36 in the base of lever arm 24. It will be seen that when pin 22 is in one of the indents 36 it rests on the periphery of circular cam member 26. The left side of the circular cam 26 is the mirror image of the right side. Pin 20 may be passed through hole 21 to pivot lever arm 17 and the cam 10 reversed in its direction when the brake is to be used for left handed operation.

Completing the construction of the apparatus a cylindrical socket 30 is provided with a spring biased pin 40 which rests against gusset 18 of lever arm 17. The spring is of sufficient rating to ensure that first lever arm 17 is pivoted in a counter-clockwise direction (in FIG. 1) so that pin 22 rests in one of the indents 32, 34 or 36.

Joined to body 38 are bracket members 42 and 44. In the embodiment illustrated the hole 46 between the brackets 42 and 44 corresponds to a circular arm of a wheelchair on which the apparatus is designed to be mounted.

In FIGS. 3, 4 and 5 there is illustrated a tire 48 having a resilient rolling surface against which the cam lobes 12 and 14 operate. Tire 48 is preferably a pneumatic tire but a resilient solid rubber tire or the like can also be used with the braking apparatus according to the invention.

When lever arm 17 is in the inoperative position cam 10 is in the position illustrated in FIG. 3 and both lobes 12 and 14 are removed from tire 48 so that it may rotate freely. When pin 22 is in indent 32 the brake is in an intermediate operative position. If the tire is rotating upwardly in the direction of the arrow in FIG. 4 it contacts the teeth of lobe 12 and pivots cam 10 in a clockwise direction so that lobe 12 acts as a brake on tire 48.

Similarly when tire 48 rotates in the direction illustrated by the arrow in FIG. 5 cam 10 is pivoted in a counter-clockwise direction and lobe 14 acts as a brake on tire 48.

If lever 24 is advanced in a clockwise direction (as illustrated in FIG. 1) so that pin 22 passes over indent 34 and rests on the outer surface of circular cam 26 in indent 36, first lever arm 17 is advanced to its maximum degree of pivoting towards a tire 48. Lobes 12 and 14 again act in the manner illustrated in FIGS. 4 and 5 except that the cam 10 is closer to the tire and the degree of compression of the tire 48 is increased.

Although the invention has been described with particular reference to a braking apparatus to be used with a wheelchair it will be appreciated by those skilled in the art that other mounting devices apart from brackets 42 and 44 might be employed to mount the device on a baby carriage or a pushchair, handcarts, tricycles or even bicycles or other vehicles of like character to provide a convenient and effective braking means for such vehicles.

We claim:

1. A braking apparatus for use with a tire having a resilient rolling surface, the tire being rotatably mounted on a frame, comprising:
   a main body member mounted on the frame;
   a first lever arm pivotally mounted on said main body member;
   a pin member mounted on and extending from said first lever arm adjacent one end thereof;
   a first cam pivotably mounted on said first lever arm adjacent the other end thereof;
   two tire engaging braking lobes on said first cam;
   means to limit the pivotal movement of said first cam to an arc of predetermined length relative to said first lever arm;
   a second cam pivotally mounted on said main body member having a curved camming surface;
   two indents on said camming surface in a position with respect to said first lever arm to selectively receive said pin member therein, one of said indents having a greater depth than the other indent relative to said camming surface; and
   biasing means operatively disposed between said main body member and said first lever arm for biasing said first lever arm about its pivot axis in the direction in which said pin member is urged into engagement in one of said indents;
   so that when said pin member is engaged in said indent having a greater depth than the other indent said first lever arm is in an inoperative position wherein said lobes of said first cam are disengaged from the tire surface to allow the tire to rotate freely, and when said pin member is engaged in the other indent said first lever arm is in an operative position wherein said cam lobes are engageable with the tire surface and said first cam is pivoted aobut its pivot axis to urge one of said cam lobes to apply braking pressure to the tire when the tire is rotating in a first direction and to urge the other of said cam lobes to apply braking pressure to the tire when the tire is rotating in a second direction opposite to said first direction.

2. A braking apparatus as claimed in claim 1 wherein, said main body member is integral with the frame.

3. A braking apparatus as claimed in claim 1 and further comprising:
   means to removably mount said main body member on the frame.

4. A braking apparatus as claimed in claim 1 and further comprising:
   a third indent on said camming surface having a lesser depth than said other indent and operatively selectively engageable with said pin member for selectively applying greater braking pressure to the tire.

5. A braking apparatus as claimed in claim 1 and further comprising:
   a second lever arm projecting radially outwardly from said camming surface of said second cam for pivotally operating said second cam about its pivot axis.

6. A braking apparatus as claimed in claim 4 and further comprising:
   a second lever arm projecting radially outwardly from said camming surface of said second cam for pivotally operating said second cam about its pivot axis.

7. A braking apparatus as claimed in claim 1 and further comprising:
   teeth on said braking lobes engageable with the tire in the operative position.

8. A braking apparatus as claimed in claim 6 and further comprising:
   teeth on said braking lobes engageable with the tire in the operative position.

9. A braking apparatus as claimed in claim 3 wherein, the frame comprises an arm frame member of a wheelchair and the tire is a tire of the wheelchair.

10. A braking apparatus as claimed in claim 8 wherein, the frame comprises an arm frame member of a wheelchair and the tire is a tire of the wheelchair.

* * * * *